SECTION "AA"

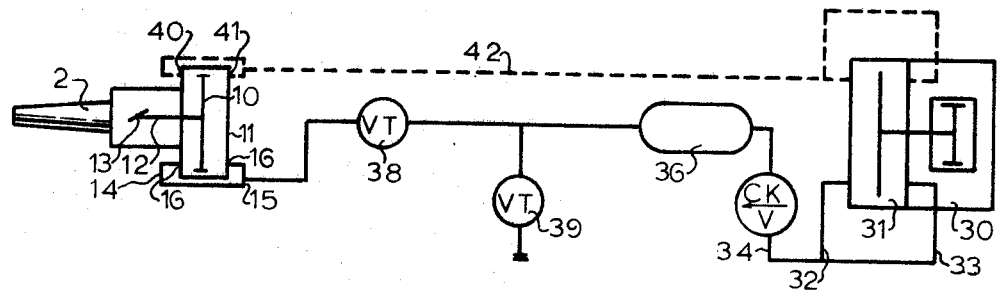
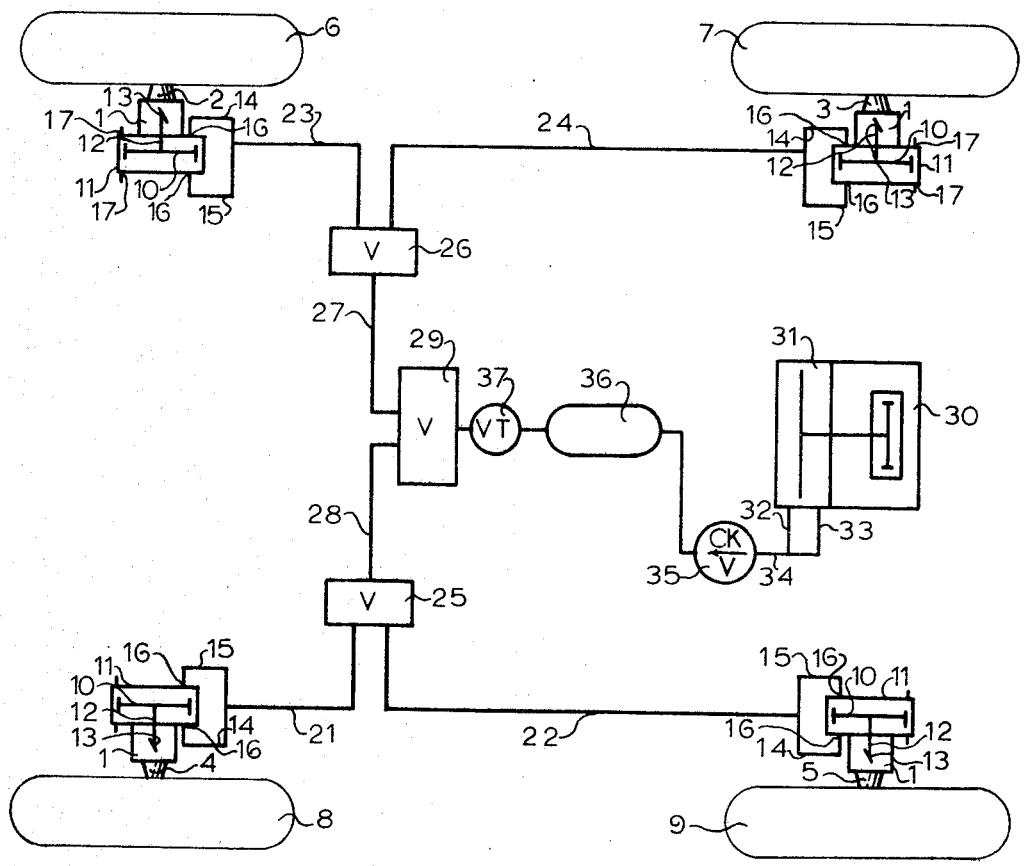

United States Patent Office 3,513,657
Patented May 26, 1970

3,513,657
FLUID CAM DRIVE
Daniel E. Nelson, Pacific Grove, Roderick A. Dresser, Sr., Monterey, and Eugene H. Hanson, Pebble Beach, Calif. (all of Box 2076, Monterey, Calif. 93940)
Filed Apr. 25, 1968, Ser. No. 724,131
Int. Cl. F01b *13/00;* F16h *25/16;* B06k *17/34*
U.S. Cl. 60—57
7 Claims

ABSTRACT OF THE DISCLOSURE

This invention relates to a new and useful fluid cam drive with a compressor compressing air or other media to a cylinder with a piston to cause reciprocating travel of a shaft attached to the piston and to cause rotary travel from the reciprocating travel by means of a counter-bevelled cam drive gear with transverse guide and cam drive members extended radially from the shaft in slidable contact with the transverse guide and counter-bevelled cam drive gear.

---

The object of this invention is to provide a separate drive means at each wheel of an automobile.

Another object of this invention is to eliminate the clutch, transmission, drive shaft, and drive axle in supplying rotary travel to wheels of an automobile or other vehicle.

Another object of this invention is to provide an automobile or other vehicle wheels with a drive means separate from a drive axle to allow for independent suspension of vehicular drive wheels.

Another object of this invention is to provide controlled speed power to wheels at opposite sides of a vehicle for directional control without other steering means, drive shaft, transmission, or braking means.

Another object of this invention is to provide automatically variable speed drive at separate wheels of a vehicle without a differential gear.

Another object of this invention is to convert linear travel of a compressed media to rotary travel of a gear or wheel for vehicles or other machinery.

This invention is an improvement over devices invented by one of the co-inventors herein and more thoroughly described in the following two copending patent applications: Ser. No. 684,337, filed Nov. 20, 1967, applicant Daniel E. Nelson, Internal Combustion Engines and Displacement Pumps; Ser. No. 707,761, filed Feb. 12, 1968, applicant Daniel E. Nelson, Cam Drives.

Advantages of this fluid cam drive over the engine referenced above are that fluid pressure for actuating the cam drive can be more uniform than the internal or external combustion pressure for the engine. This increases the operative life of the cam drive and causes uniform power. The pressure source can be positioned at a separate position from the cam drive. Heat of combustion for generating pressures by a prime mover can be positioned away from the rotative means and the machinery or conditions associated therewith. Further, air can be used as a fluid drive media in preference to heavier and more costly material.

Advantages over conventional drive means are that this invention is lighter, more efficient, less expensive, safer, more convenient, and longer-lasting than turbine drives, gear and shaft drives, electrical drives, or present hydraulic drives.

This invention is illustrated in the accompanying drawings as follows:

FIG. 1 is a plan view showing wheels of an automobile or other vehicle with a central compressor and a separate cam drive with autuomatically adjustable drive pressure at each wheel.

FIG. 2 is a partial plan view showing an axle and a separate pressure line with throttleable fluid drive pressure from a central compressor for controlled power gearing of tractors or other vehicles and machinery. Also illustrated is a return line for closed cycle pressure systems.

Figure 3:
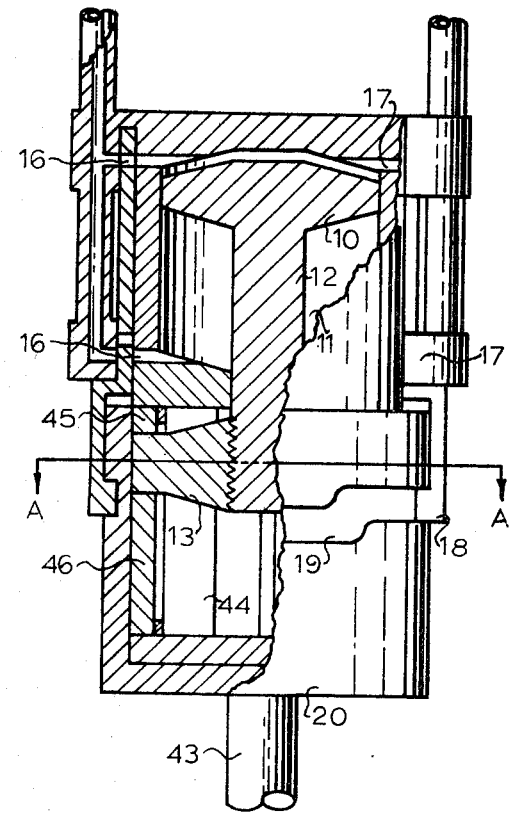
FIG. 3 is a cutaway view of the drive unit.

The operation of these improvements in fluid cam drives is accomplished in the following manner. Referring to FIG. 1, a cam drive 1, as described in the above referenced cam drive patent application, is provided at axles 2, 3, 4, and 5 of vehicle wheels 6, 7, 8, and 9 respectively. A piston 10 in cylinder 11 is provided with a shaft 12 attached to cam drive members 13 of the cam drive. Inlet fluid lines 14 and 15 are caused to convey compressed fluid to valved inlet ports 16 at opposite ends of the cylinder. Valved outlet ports 17, also at opposite ends of the cylinder, are provided to discharge the fluid at the bottom end of each stroke. The valves are actuated by a cam follower 18 in slidable contact with a cam channel 19 at drive sleeve 20. The valves and cam followers are shown in FIG. 3. Individual fluid lines 21, 22, 23, and 24 are provided to supply fluid to the inlet fluid lines at the separate wheels. Automatically adjustable secondary flow valves 25 and 26 are caused to regulate flow of fluid to sets of individual fluid lines from feeder lines 27 and 28. A central automatically adjustable fluid valve 29 is caused to regulate flow rate to the feeder lines. A prime mover 30 and compressor 31 are provided to supply fluid to collector lines 32 and 33, to central line 34, through check valve 35, into accumulator 36, and then through throttleable valve 37.

The prime mover shown is a schematic illustration of copending patent application Ser. No. 666,228, filed Aug. 17, 1967, by Daniel E. Nelson et al., for Regenerative Piston Engines.

Referring to FIG. 2, separate throttleable valves 38 and 39 are provided for separate wheels or sets of wheels for steering vehicles or regulating rotational speed of machinery. Return lines 40, 41, and 42 can be employed for a closed cycle fluid system in either the FIG. 2 controllable or the FIG. 1 automatically adjustable speed system.

Figure 4:
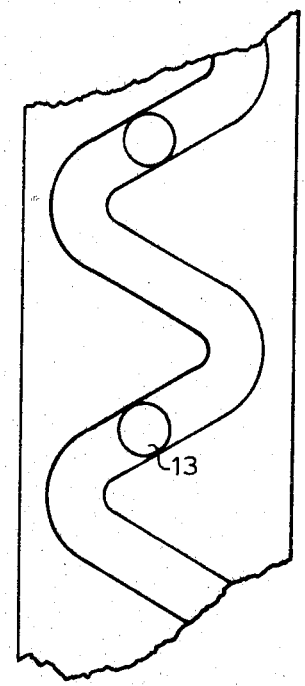
FIG. 4 is a cutaway view of the cam and drive member.
Figure 5:
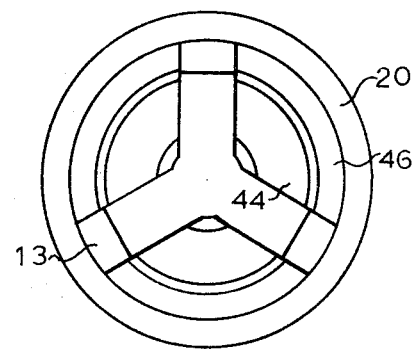
FIG. 5 is a section view of the cam and drive member at section AA of FIG. 3.

A detailed description of one form of the referenced cam drive application is shown in FIGS. 3, 4, and 5. Reciprocating travel of the piston and shaft is converted to rotational travel of the drive sleeve with drive shaft 43 attached. The drive members are extended radially in slidable contact with transverse guide 44 and with cams 45 and 46 alternately. Pressure against the piston 10 is converted to pressure against drive member 13 such that reciprocating travel of piston 10 causes drive members 13 to engage alternately the opposite sides of cam 46. Rotary travel of drive member 13 is prevented by slidable contact with transverse guide 44. Travel to an end of a stroke by piston 10 causes drive member 13 to travel to the end of a cam plane and to continue travel into an opposite cam plane for continued rotary travel of the cam in the direction initiated.

A more efficient fluid drive device has been invented and all changes and modifications that may be made without departing from the spirit of the invention are contemplated within the scope of the appended claims.

We claim:
1. A fluid cam drive comprising:
   a compressor,
   a cam drive,
   a cam drive cylinder,
   inlet and outlet valved ports in the cylinder,
   a piston, a shaft attached to the piston and extended through a head of the cylinder in slidable contact therewith, counterbevelled cam drive surfaces around the periphery of a drive sleeve, a transverse guide attached to the cylinder, cam drive members attached to the shaft and extended radially in slidable contact with the transverse guide and with the cam drive surfaces of the drive sleeve, and fluid lines from the compressor to the cam drive cylinder.

2. In a fluid cam drive substantially as described in claim 1, a multiplicity of cam drives, fluid lines between the compressor and the cam drives, and throttleable pressure control valves in the fluid lines.

3. In a fluid cam drive substantially as described in claim 1, fluid lines from the compressor to the cam drive, and return fluid lines from the cam drive to the compressor.

4. In a fluid cam drive substantially as described in claim 1, a multiplicity of cam drives, an automatically adjustable flow valve, fluid lines between the compressor and the flow valve, and fluid lines between the flow valve and the cam drives.

5. In a fluid cam drive substantially as described in claim 1, a multiplicity of cam drives, a central automatically adjustable flow valve, fluid lines from the compressor to the central automatically adjustable flow valve, secondary automatically adjustable flow valves, and fluid lines from the central flow valve to the secondary valve and the cam drives.

6. In a fluid cam drive substantially as described in claim 1, valve drive cam surfaces on the drive sleeve, and cam drive cylinder inlet and outlet valves in slidable contact with the valve drive cam surfaces.

7. In a fluid cam drive substantially as described in claim 1, a double acting piston compressor, and a regenerative piston prime mover.

References Cited

UNITED STATES PATENTS

| | | | |
|---|---|---|---|
| 859,235 | 7/1907 | MacFarren | 60—62 XR |
| 1,026,662 | 5/1912 | Eisner | 60—62 XR |
| 1,177,609 | 4/1916 | Edwards | 74—57 |
| 1,801,633 | 4/1931 | MacKirdy | 92—31 |
| 1,963,091 | 6/1934 | Jenkins | 60—57 XR |

EDGAR W. GEORGHEGAN, Primary Examiner

U.S. Cl. X.R.

74—57; 92—31; 180—44